United States Patent Office 3,262,912
Patented July 26, 1966

3,262,912
CURING OF EPOXY RESINS WITH THE 3-AMINO-PROPYL ETHER OF DIETHYLENE GLYCOL
Phil H. Wilken, Raleigh, N.C., assignor to Monsanto Company, a corporation of Delaware
No Drawing. Filed Aug. 20, 1962, Ser. No. 218,118
12 Claims. (Cl. 260—47)

This invention relates to the curing of epoxy resins. More particularly, this invention relates to use of a novel curing agent for epoxy resins.

Epoxy resins have been found to be of great utility in a number of applications. These resins are useful as bonding agents and laminates as, for example, in the lamination of glass cloth, in bonding wood to wood, metal to metal, metal to wood, and the like. The resins also are used in solid rocket fuels, protective coatings, castings, adhesives, elastic fibers, and the like. The epoxy resins are normally found as viscous liquids, semi-solids or solids, and are subsequently cured either at ambient temperature or by heating in the presence of a suitable curing agent. The epoxy resins may be cured to form resins that are very hard and durable and have excellent electrical resistivity and inertness to chemicals.

Epoxy resins have been subjected heretofore to cure with various amines including hydroxyamines. It is known that the hydroxy-epoxy reaction will take place and that it is catalyzed by tertiary amines. Normally, however, in the use of these hydroxyamine curing agents high temperatures, e.g. 135° to 150° C., are necessary in order to carry out the cure.

Epoxy resin compositions that may be cured at ambient temperatures without application of external heat have many applications. They are of great advantage, for example, in making castings in that the necessity for heating the cumbersome mold together with casting which it contains is eliminated. Instead, the casting may be poured into a mold, stored at room temperature for a few hours, after which the casting may be used without further heat treatment or being subjected to a post-cure at a high temperature.

It is an object of the present invention to provide a new curing agent for epoxy resins.

It is another object of this invention to provide an epoxy resin composition that may be cured at ambient temperatures without application of external heat.

It is a further object of this invention to provide curable epoxy resin compositions that give products having excellent resistance to heat and to solvents.

Other objects and advantages of the present invention will be apparent from the following detailed description thereof and the novel features will be particularly pointed out hereinafter in connection with the appended claims.

In accordance with the present invention the curing of epoxy resins is effected in the presence of the 3 amino-propyl ether of diethylene glycol.

The epoxy ether resins suitable for use in the compositions of this invention comprise those having a 1,2-epoxy equivalency greater than 1. By epoxy equivalency is meant the average number of 1,2-epoxy groups:

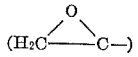

per molecule of the epoxy ether. Such ethers will cure by reacting with the hydroxy amine curing agent of this invention to produce crosslinked thermo-set solids of high molecular weight. Where one specific epoxy ether is involved in contrast to a mixture of ethers, the epoxy equivalency will be an integer. Thus, the epoxy equivalency of a specific compound such as the diglycidyl ether of bis-(4-hydroxy phenyl)-2,2-propane is two while that of the triglycidyl ether of a glycerol is three. Since most commercial epoxy ethers are usually mixtures of a number of specific ethers of different molecular weights, the epoxy equivalency is necessarily, in such cases, an average value, and is unlikely to be an integer. An epoxy equivalency of 1.50 for example, means that there are an average of 1.50 epoxy groups per molecule of the epoxy ethers present in the mixture.

The epoxy equivalency is determined by dividing the measured average molecular weight by the epoxide equivalent weight. The "epoxide equivalent weight" is the weight of the epoxy ether which contains one equivalent weight of a 1,2-epoxy group. It is determined by reacting a known quantity of the epoxy ether with a known quantity of hydrochloric acid and back-titrating the remaining acid to determine its consumption. The usual procedure is to heat a weighed sample of the epoxy ether with an excess of 0.2 N pyridinium chloride in pyridine solution at the boiling point under reflux for 2 hours whereby the pyridinium chloride quantitatively hydrochlorinates the epoxy groups to chlorhydrin groups. After cooling, the excess pyridinium chloride is back-titrated with 0.1 N sodium hydroxide in methanol to the phenolphthalein end point. The epoxide equivalent weight is calculated by considering that each molecule of consumed HCl from the pyridinium chloride combines with an epoxy group.

Suitable epoxy ethers include, for example, monoethers such as diglycidyl ether or di(2-methylglycidyl) ether but more preferably polyethers such as the 1,2-epoxy-containing polyethers of polyhydric alcohols or of polyhydric phenols. Suitable polyethers of polyhydric alcohols include the polyglycidyl polyethers of ethylene glycol, trimethylene glycol, butylene glycol, dipropylene glycol, glycerol, diglycerol, erythritol, pentaglycerol, pentaerythritol, mannitol, sorbitol, polyallyl alcohol, polyvinyl alcohol, inositol, p-xylylene glycol, and the like. These polyglycidyl polyethers may be prepared according to well-known methods, for example, reacting the polyhydric alcohol with epichlorohydrin in the presence of 0.1 percent to 5.0 percent by weight of an acid acting compound, such as boron trifluoride, hydrofluoric acid, or stannic chloride to form the chlorohydrin ether. The reaction is effected at about 50° C. to 125° C. using the reactants in such proportions that there is at least one mole of epichlorohydrin for every equivalent of hydroxyl group in the polyhydric alcohol. The chlorohydrin ether is then dehydrochlorinated by heating at about 50° C. to 125° C. with a small stoichiometrical excess, approximately 10 percent, of a base such as sodium aluminate.

Suitable polyethers of polyhydric phenols include the polyglycidyl polyethers of dihydric phenols, including mononuclear phenols such as resorcinol, catechol, hydroquinone, methyl resorcinol and the like, and polynuclear phenols such as 4,4'-dihydroxy benzophenone, 1,5-dihydroxynaphthalene and bisphenols such as 2,2-bis(4-hydroxyphenyl) propane, 1,1-bis(4-hydroxyphenyl) propane, 1,1-bis(4-hydroxyphenyl) isobutane, 2,2-bis(4-hydroxyphenyl) butane, 2,2-bis(4-hydroxy-2-methylphenyl) propane, 1,1-bis(4-hydroxyphenyl)-2-methyl propane, 3,3-bis(4-hydroxyphenyl) pentane, 1,1-bis(4-hydroxyphenyl)-2-ethyl hexane, and bis(4-hydroxyphenyl) methane.

The glycidyl ethers of the polyhydric phenols may be prepared according to well-known methods. For example, the glycidyl ethers of the dihydric phenols may be prepared by reacting the dihydric phenol with epichlorohydrin at 50° C. to 150° C. using a molar excess of the epichlorohydrin in the presence of a base such as potassium hydroxide, sodium hydroxide, calcium hydroxide, and the like, the base being usually employed in slight stoichiometric excess of the epichlorohydrin. The usually complex mixture of products from such reaction may be generally represented by the formula:

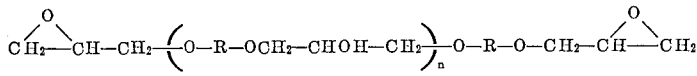

where R represents a divalent hydrocarbon radical of the dihydric phenol and where $n$ is an integer of the series 0, 1, 2, 3, and the like. The average length of the chain enclosed in the parentheses can be varied by changing the molar ratio of epichlorohydrin to dihydric phenol. Generally, as the molar ratio of epichlorohydrin to dihydric phenol is decreased from 2:1 towards 1:1 the average value of $n$ increases, increasing the softening temperature of the resulting product.

It is preferred that the epoxy ethers employed in the compositions of this invention contain only carbon, oxygen, and hydrogen. However, other epoxy ethers may also be employed if desired for example the glycidyl ethers of polyhydric thio ethers such as 2,2'-dihydroxy diethyl sulfide, or the glycidyl ethers of the thio alcohols such as alpha-monothioglycerol.

Particularly preferred in the present invention are the polyglycidyl polyethers of alkylene bisphenols (e.g., 2,2-bis(4-hydroxyphenyl) propane) having molecular weights ranging from about 350 to 800 and epoxide equivalent weights ranging from about 175 to 400.

The curing agent used to prepare the compositions of the present invention is the 3-aminopropyl ether of diethylene glycol having the formula:

$$HO\text{---}(CH_2CH_2\text{---}O\text{---})_2CH_2CH_2CH_2NH_2$$

The amount of curing agent used in the compositions of this invention will depend upon the particular epoxy resin that is used. The ratio of hydroxyamine to epoxy ether should be about 90 to 110 percent of the theoretical equivalent weight necessary. It is preferred to use an equivalent weight of hydroxyamine.

The curing of the epoxy resin using 3-aminopropyl ether of diethylene glycol may be carried out at low temperatures. The curing step may be carried out at room temperature, about 23° C., or up to 40° C. depending upon the epoxy resin being cured. A period of several days may be necessary at room temperature for the cure to take place whereas only a matter of hours may be needed at 40° C. It is to be understood that higher temperatures, e.g., over 100° C., may also be used to cause the cure if desired.

When desired a suitable solvent, filler, thixotropping agent, diluent, and the like may be incorporated in the epoxy resin and/or the curing agent prior to curing. When the resin is supplied as a solid, it may be dissolved in a suitable solvent, and the curing agent intimately admixed therein. Any suitable solvent may be employed. Illustrative of solvents that may be used include the volatile solvents that may escape from the composition, such as the ketones, like acetone, methyl ethyl ketone, methyl isobutyl ketone, and the like; esters, such as ethyl acetate, butyl acetate, cellosolve acetate, ethylene glycol monoacetate, methyl cellosolve acetate; ether alcohols, such as methyl, ethyl, or butyl ether of ethylene glycol or diethylene glycol; chlorinated hydrocarbons such as trichloropropane, chloroform, and the like; ethers such as tetrahydrofuran and the like. These active solvents may be used in admixture with aromatic hydrocarbons, such as benzene, toluene, xylene and the like; and/or alcohols, such as ethyl, isopropyl or butyl alcohol and the like. Other solvents that might be used include cyano-substituted hydrocarbons such as acetonitrile, propionitrile, benzonitrile, and the like.

The use of fillers will depend upon the purpose for which the epoxy resin is to be used. Illustrative of suitable fillers include powdered metals and metal oxides such as powdered iron oxide, inorganic silicates, sand, glass asbestos, carbon, and the like. In order to prevent the filler from settling during curing, an organo philic thixotropping agent may be employed. Diluents such as hydrocarbons, for example, benzene, toluene, and the like, may also be employed. These are especially useful when dealing with liquid resins.

The invention will be more fully described with reference to the following examples demonstrating the preparation of the compositions of this invention. These examples are intended to be illustrative only and not as a limitation on the scope of the invention.

*Example I*

Epon 828 is an epoxy ether resin manufactured by the Shell Chemical Corporation, prepared by reacting 2,2-bis(4-hydroxyphenyl) propane with epichlorohydrin. It has an average molecular weight about 380, a softening point of about 8–12° C. (by Durrans' mercury method), a specific gravity of 1.2, an epoxide equivalent weight of about 190, and a 1,2-epoxy equivalency of about 1.8. It may be prepared, for example, according to the procedure described for the preparation of "polyether A" in U.S. Patent 2,643,239.

Epon 834 is an epoxy ether resin manufactured by the Shell Chemical Corporation, prepared by reacting 2,2-bis(4-hydroxyphenyl) propane with epichlorohydrin. It has an average molecular weight of about 510 and an epoxide equivalent weight of about 255.

Polyglycol amine H–163 is the 3-aminopropyl ether of diethylene glycol manufactured by the Union Carbide Corporation. It is a clear, colorless liquid having a molecular weight of about 163 and a specific gravity (20/20° C.) of 1.0556.

A mixture of 9.4 grams of Epon 828 and 4.1 grams of Polyglycol Amine H–163 was blended with vigorous stirring and then poured into aluminum dishes. The contents of one dish was allowed to stand at room temperature, about 23° C., and a cured, crosslinked resin was obtained after 4 days. The contents of another dish was heated in an oven at 40° C. for a period of 24 hours. At the end of that time a cured crosslinked resin was obtained.

The crosslinking of the resins in this example and those which follow was shown by the failure of the resin to melt when brought into contact with the heated surface of a hot plate.

*Example II*

A mixture of 9.4 grams of Epon 828 and 4.5 grams of Polyglycol Amine H–163 was blended with vigorous stirring, poured into an aluminum dish, and allowed to stand at room temperature, about 23° C. At the end of four days a cured, crosslinked resin was obtained.

*Example III*

A mixture of 9.4 grams of Epon 828 and 3.7 grams of Polyglycol Amine H–163 was blended with vigorous stirring, poured into an aluminum dish, and allowed to stand at room temperature, about 23° C. After four days, the resin had not crosslinked, but when the resin was placed into a 40° C. oven for three hours a crosslinked resin was obtained.

*Example IV*

A mixture of 12.8 grams of Epon 834 and 4.1 grams of Polyglycol Amine H–163 was blended with vigorous stirring and then poured into aluminum dishes. The contents of one dish was allowed to stand at room temperature, about 23° C., and a cured, crosslinked resin was obtained after 24 hours. The contents of another dish was heated in a 40° C. oven for a period of 24 hours. At the end of that time a cured, crosslinked resin was obtained.

*Example V*

A mixture of 9.4 grams of Epon 834 and 4.5 grams of Polyglycol Amine H–163 was blended with vigorous stirring and then poured into aluminum dishes. The contents of one dish was allowed to stand at room temperature, about 23° C., and a cured, crosslinked resin was obtained after 48 hours. The contents of another dish was heated in a 40° C. oven for a period of 24 hours. At the end of that time a cured, crosslinked resin was obtained.

*Example VI*

A mixture of 9.4 grams of Epon 834 and 3.7 grams of Polyglycol Amine H–163 was blended with vigorous stirring and then poured into aluminum dishes. The contents of one dish was allowed to stand at room temperature, about 23° C. and was thermoplastic after 6 days. The contents of another dish was heated in a 40° C. oven for a period of 24 hours. At the time of that time a cured, crosslinked resin was obtained.

It will be understood that various changes in the details, materials, and the like, which have been herein described and illustrated in order to explain the nature of the invention, may be made by those skilled in the art within the principle and scope of the invention as expressed in the appended claims.

I claim:

1. A curable composition comprising an epoxy ether resin having a 1,2-epoxy equivalency greater than one, and a hydroxyamine of the formula $$HO—(CH_2CH_2O)_2CH_2CH_2CH_2NH_2$$

2. The cured product of the composition defined in claim 1.

3. A curable composition comprising an epoxy ether resin having a 1,2-epoxy equivalency greater than one selected from the group consisting of polyglycidyl ethers of polyhydric phenols and polyhydric alcohols, and a hydroxyamine of the formula $$HO—(CH_2CH_2O)_2CH_2CH_2CH_2NH_2$$

4. The cured product of the composition defined in claim 3.

5. A curable composition comprising an epoxy ether resin comprising a polyglycidyl polyether of a dihydric phenol, and a hydroxyamine of the formula $$HO—(CH_2CH_2O)_2CH_2CH_2CH_2NH_2$$

6. The cured product of the composition defined in claim 5.

7. A curable composition comprising an epoxy ether resin comprising a polyglycidyl polyether of a dihydric phenol, and about 0.90 to 1.10 equivalents of a hydroxyamine of the formula $$HO—(CH_2CH_2O)_2CH_2CH_2CH_2NH_2$$

per equivalent of polyglycidyl polyether.

8. The cured product of the composition defined in claim 7.

9. A process for curing an epoxy ether resin having a 1,2-epoxy equivalency greater than one which comprises mixing said epoxy ether resin at a temperature of about 23° C. to about 40° C. with a hydroxyamine of the formula $$HO—(CH_2CH_2O)_2CH_2CH_2CH_2NH_2$$

10. A process for curing an epoxy ether resin having a 1,2-epoxy equivalency greater than one selected from the group consisting of polyglycidyl ethers of polyhydric phenols and polyhydric alcohols which comprises mixing said epoxy ether resin at a temperature of about 23° C. to about 40° C. with a hydroxyamine of the formula $$HO—(CH_2CH_2O)_2CH_2CH_2CH_2NH_2$$

11. A process for curing an epoxy ether resin comprising a polyglycidyl polyether of a dihydric phenol which comprises mixing said epoxy ether resin at a temperature of about 23° C. to about 40° C. with a hydroxyamine of the formula $$HO—(CH_2CH_2O)_2CH_2CH_2CH_2NH_2$$

12. A process for curing an epoxy ether resin comprising a polyglycidyl polyether of a dihydric phenol which comprises mixing said epoxy ether resin with from about 0.90 to 1.10 equivalents of a hydroxyamine of the formula $$HO—(CH_2CH_2O)_2CH_2CH_2CH_2NH_2$$

per equivalent of polyglycidyl ether at a temperature of about 23° C. to about 40° C.

References Cited by the Examiner

FOREIGN PATENTS 229,422  7/1960  Australia.

WILLIAM H. SHORT, *Primary Examiner.*

T. D. KERWIN, *Assistant Examiner.*